(12) United States Patent
Lee et al.

(10) Patent No.: US 12,474,507 B2
(45) Date of Patent: Nov. 18, 2025

(54) LENS, LENS ASSEMBLY, AND MOBILE ELECTRONIC DEVICE

(71) Applicant: SAMSUNG ELECTRO-MECHANICS CO., LTD., Suwon-si (KR)

(72) Inventors: Tae Kyung Lee, Suwon-si (KR); Ji Hye Nam, Suwon-si (KR); Hye Lee Kim, Suwon-si (KR); Jong Hyouk Kim, Suwon-si (KR); Jong Won Yun, Suwon-si (KR); Seong Ho Eom, Suwon-si (KR); Seong Chan Park, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 646 days.

(21) Appl. No.: 17/750,643

(22) Filed: May 23, 2022

(65) Prior Publication Data

US 2023/0022852 A1    Jan. 26, 2023

(30) Foreign Application Priority Data

Jul. 15, 2021 (KR) .......................... 10-2021-0092980
Feb. 9, 2022 (KR) .......................... 10-2022-0016935

(51) Int. Cl.
*G02B 1/115* (2015.01)
*G02B 1/18* (2015.01)

(52) U.S. Cl.
CPC ................ *G02B 1/115* (2013.01); *G02B 1/18* (2015.01)

(58) Field of Classification Search
CPC .................................... G02B 1/18; G02B 1/10
See application file for complete search history.

(56) References Cited

U.S. PATENT DOCUMENTS

| | | |
|---|---|---|
| 2006/0199040 A1 | 9/2006 | Yamada et al. |
| 2012/0008206 A1 | 1/2012 | Haga et al. |
| 2012/0050871 A1 | 3/2012 | Sakai et al. |
| 2013/0038834 A1 | 2/2013 | Cado et al. |
| 2016/0377827 A1 | 12/2016 | Kang et al. |
| 2017/0139082 A1 | 5/2017 | Takai et al. |
| 2018/0162091 A1* | 6/2018 | Takeda ................ G02B 5/0247 |
| 2018/0185875 A1 | 7/2018 | Murakami et al. |
| 2019/0116300 A1* | 4/2019 | Okuno ........... G02B 15/144113 |
| 2019/0278046 A1 | 9/2019 | Yamamoto |
| 2019/0377104 A1 | 12/2019 | Otani et al. |

(Continued)

FOREIGN PATENT DOCUMENTS

| | | |
|---|---|---|
| CN | 1834693 A | 9/2006 |
| CN | 101815958 A | 8/2010 |

(Continued)

OTHER PUBLICATIONS

Wada, English translation for JP-2020030427-A (Year: 2020).*

(Continued)

*Primary Examiner* — Jonathan Y Jung
(74) *Attorney, Agent, or Firm* — NSIP Law

(57) ABSTRACT

A lens includes a lens unit, an uneven layer formed on at least a portion of a surface of the lens unit, a buffer layer covering the uneven layer and having a shape conforming to an uneven surface of the uneven layer, and a water-repellent layer covering the buffer layer.

32 Claims, 18 Drawing Sheets

(56) References Cited

U.S. PATENT DOCUMENTS

| | | | |
|---|---|---|---|
| 2020/0012017 A1 | 1/2020 | Shimoda | |
| 2020/0326457 A1 | 10/2020 | Jeon et al. | |
| 2021/0165136 A1 | 6/2021 | Tsai et al. | |
| 2022/0186065 A1 | 6/2022 | Faber et al. | |
| 2022/0389240 A1* | 12/2022 | Uematsu | C08G 18/7831 |

FOREIGN PATENT DOCUMENTS

| | | | | |
|---|---|---|---|---|
| CN | 103329013 A | | 9/2013 | |
| CN | 106291857 A | | 1/2017 | |
| CN | 107482106 A | | 12/2017 | |
| CN | 107924002 A | | 4/2018 | |
| CN | 110383112 A | | 10/2019 | |
| CN | 110612464 A | | 12/2019 | |
| CN | 112882137 A | | 6/2021 | |
| EP | 3 441 800 A1 | | 2/2019 | |
| JP | 2010-249852 A | | 11/2010 | |
| JP | 2012-73590 A | | 4/2012 | |
| JP | WO2016/021560 A1 | | 2/2016 | |
| JP | 2016-71230 A | | 5/2016 | |
| JP | 2017187760 A | * | 10/2017 | B32B 27/36 |
| JP | WO2018/168326 A1 | | 9/2018 | |
| JP | 2018-159892 A | | 10/2018 | |
| JP | 2020030427 A | * | 2/2020 | |
| JP | 2020-38311 A | | 3/2020 | |
| JP | 2020-181073 A | | 11/2020 | |
| KR | 10-2017-0008169 A | | 1/2017 | |
| KR | 10-2017-0034557 A | | 3/2017 | |
| KR | 10-2184006 B1 | | 11/2020 | |
| TW | 201915521 A | | 4/2019 | |
| TW | 202031814 A | | 9/2020 | |
| WO | WO 2017/175588 A1 | | 10/2017 | |
| WO | WO-2018174049 A1 | * | 9/2018 | |

OTHER PUBLICATIONS

Kawagishi, English translation for WO-2018174049-A1 (Year: 2018).*
Wada et al., English translation for JP-2017187760-A (Year: 2017).*
Taiwanese Office Action issued on May 24, 2023, in counterpart Taiwanese Patent Application No. 111119964 (5 pages in English, 4 pages in Chinese).
Isakov, Kirill, et al. "Superhydrophobic Antireflection Coating on Glass Using Grass-like Alumina and Fluoropolymer." ACS applied materials & interfaces 12.44 (2020): 49957-49962.
Korean Office Action issued on Apr. 12, 2023, in counterpart Korean Patent Application No. 10-2022-0016935 (10 pages in English, 7 pages in Korean).
Chinese Office Action Issued on Jun. 18, 2025, in Counterpart Chinese Patent Application No. 202210826319.4 (4 Pages in English, 10 Pages in Chinese).

* cited by examiner

LENS, LENS ASSEMBLY, AND MOBILE ELECTRONIC DEVICE

CROSS-REFERENCE TO RELATED APPLICATIONS

This application claims the benefit under 35 USC 119(a) of Korean Patent Application No. 10-2021-0092980 filed on Jul. 15, 2021, and Korean Patent Application No. 10-2022-0016935 filed on Feb. 9, 2022, in the Korean Intellectual Property Office, the entire disclosures of which are incorporated herein by reference for all purposes.

BACKGROUND

1. Field

Example embodiments of the present disclosure relate to a lens, a lens assembly, and a mobile electronic device.

2. Description of the Background

As functions of a camera in a mobile electronic device such as a mobile phone, a tablet PC, a laptop, or the like, have advanced, technology of lenses used therein has also advanced. Lenses may collect or disperse light, and using this function, a lens may enlarge or reduce a size of an image, and a representative function may be using linear travelling and refractive properties of light. By using the functions described above, an image size of light passing through the lens may be enlarged or reduced. Also, when a lens is used, the field of view may be different from an actual field of view, and accordingly, a lens may capture a wider or further magnified image than the actual image viewed by the human eye. However, when light is refracted, light may not converge at one point and may be spread or distorted, and this phenomenon may be called aberration. Due to aberration, images of a lens may be distorted when images are captured, and sharpness may be affected, such that resolution may degrade. To address the issue, a combination of various lenses may be used, and by various lenses used in a camera, aberration may be calibrated.

However, light incident to a lens may cause internal reflection on a surface or an internal wall of the lens. Such light may cause a flare phenomenon on the screen, and to prevent such a phenomenon, it may be necessary to minimize light transmittance and light reflectance in the visible ray region.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens includes a lens unit, an uneven layer formed on at least a portion of a surface of the lens unit, a buffer layer covering the uneven layer and having a shape conforming to an uneven surface of the uneven layer, and a water-repellent layer covering the buffer layer.

The buffer layer may have a thickness greater than a thickness of the water-repellent layer.

The uneven layer may include an uneven structure having an irregular shape.

The uneven layer may include a cavity formed by at least a portion of the uneven structure.

The uneven surface of the uneven layer may have a roughness Ra of 10 nm or more.

The uneven surface of the uneven layer may have a roughness Ra of 10 nm or more and 100 nm or less.

A thickness of the buffer layer may be 2 nm or more and 10 nm or less.

The buffer layer may include at least one material selected from a group consisting of siloxane, $SiO_2$, SiON, $Si_3N_4$, $TiO_2$, TiON, and TiN.

The water-repellent layer may have a shape conforming to a surface of the buffer layer.

The water-repellent layer may form a chemical bond with the buffer layer.

A thickness of the water-repellent layer may be 10 nm or less.

The lens may further include a base layer disposed between the lens unit and the uneven layer.

The base layer may include a $SiO_2$ layer.

A thickness of the base layer may be 200 nm or less.

The base layer may include a laminated structure including a $SiO_2$ layer and a $TiO_2$ layer.

The uneven layer may be formed on one surface of the lens unit and an other surface opposing to the one surface.

The lens may further include a base layer disposed on the one surface and the other surface of the lens unit between the lens unit and the uneven layer.

The uneven layer may be formed directly on one surface of the lens unit, and the lens may further include a base layer disposed between the lens unit and the uneven layer on the other surface of the lens unit.

In another general aspect, a lens includes a lens unit, and a coating portion formed on at least a portion of a surface of the lens unit, and including an uneven layer and a water-repellent layer covering the uneven layer and forming a chemical bond with the uneven layer.

The water-repellent layer may include a fluorocarbon component having a Si head group.

In another general aspect, a lens assembly includes one or more lenses, wherein at least one of the one or more lenses is a low-reflection lens including a lens unit, an uneven layer formed on at least a portion of a surface of the lens unit, a buffer layer covering the uneven layer and having a shape conforming to an uneven surface of the uneven layer, and a water-repellent layer covering the buffer layer.

The low-reflection lens may be disposed on an outermost surface of the lens assembly in an optical axis direction among the one or more lenses.

In another general aspect, a mobile electronic device includes a display unit, and a lens assembly, wherein the lens assembly includes one or more lenses, and wherein at least one of the one or more lenses is a low-reflection lens including a lens unit, an uneven layer formed on at least a portion of a surface of the lens unit, a buffer layer covering the uneven layer and having a shape conforming to an uneven surface of the uneven layer, and a water-repellent layer covering the buffer layer.

The low-reflection lens may be disposed on an outermost surface of the lens assembly in an optical axis direction of the one or more lenses.

The lens assembly may be covered by the display unit.

The lens assembly may be covered by tempered glass.

In another general aspect, a low-reflection lens includes a lens unit including one surface and an other surface opposing the one surface, an uneven layer disposed one or more of the one surface and the other surface, and a water repellent layer disposed on the uneven layer.

The low-reflection lens may further include a buffer layer disposed between the uneven layer and the water repellent layer on one or more of the one surface and the other surface.

The low-reflection lens may further include a base layer disposed between the uneven layer and the lens unit on one or more of the one surface and the other surface.

The base layer may include a laminated structure including a first material layer and a second material layer different from the first material layer on one or more of the one surface and the other surface.

A lens assembly may include one or more lenses, wherein the one or more lenses may include at least one low-reflection lens.

The at least one low-reflection lens may include a lens disposed on an outermost side of the lens assembly in an optical axis direction of the one or more lenses.

A mobile electronic device may include the lens assembly, and a display unit, wherein the lens assembly may be covered by one or more of the display unit and a tempered glass.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
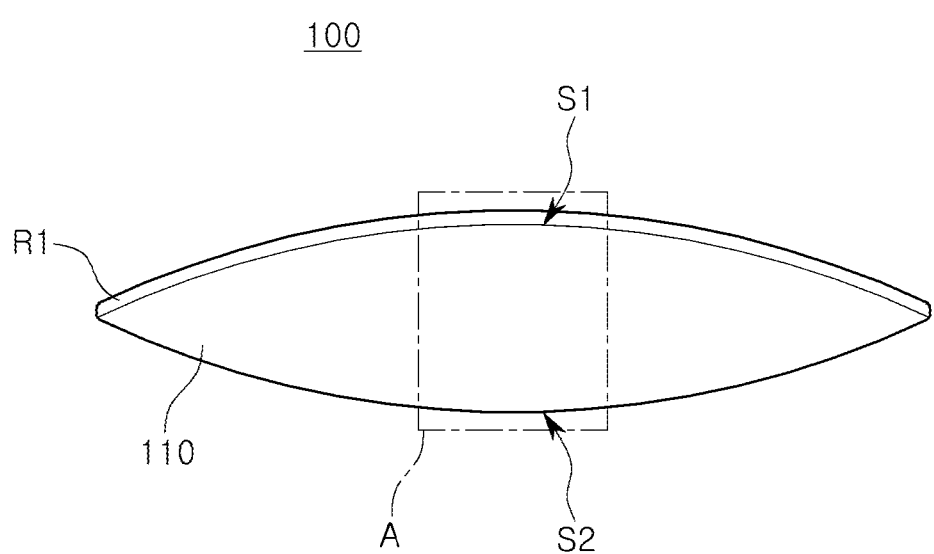
FIG. 1 is a cross-sectional diagram illustrating a lens according to an example embodiment of the present disclosure.

Hereinafter, while example embodiments of the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Example embodiments of the present disclosure as described herein may provide a lens having a surface coating structure having low reflectivity, a lens assembly including the same, and a mobile electronic device including the same.

Figure 2:
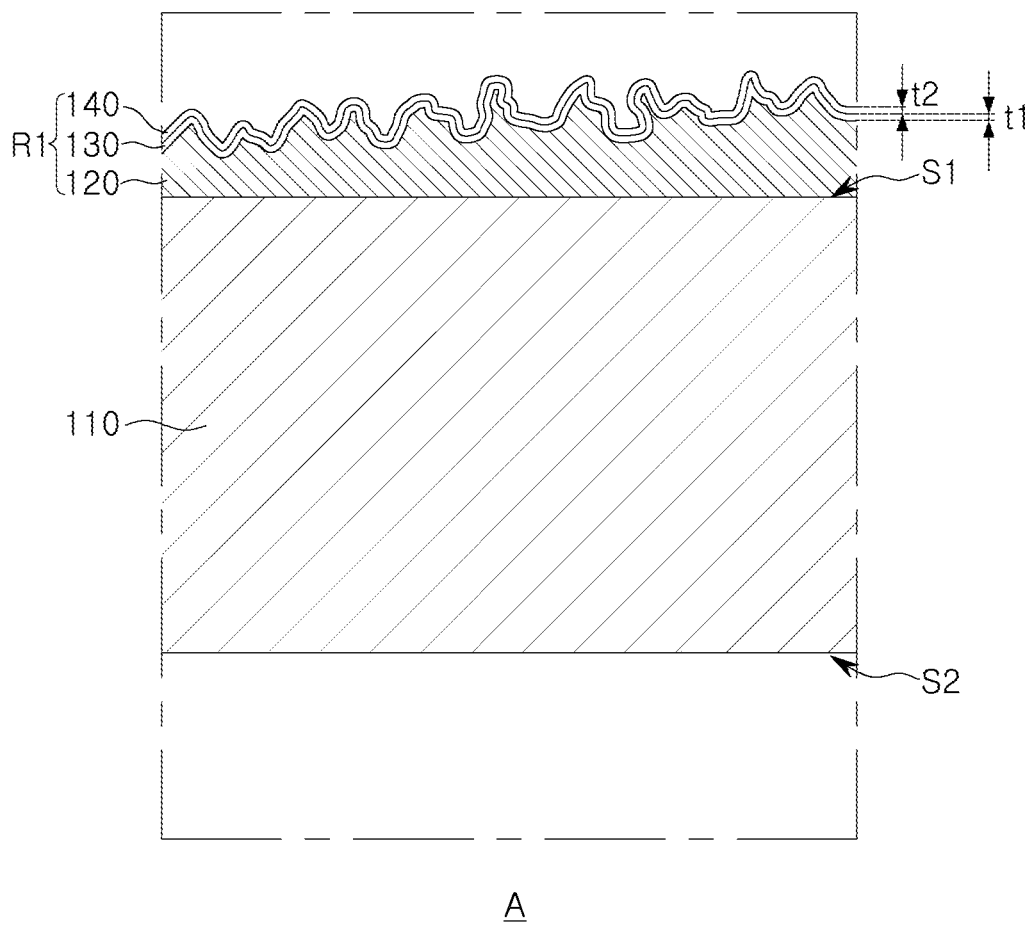
FIGS. 2 and 3 are enlarged diagrams illustrating one region of the lens in FIG. 1.
Figure 3:
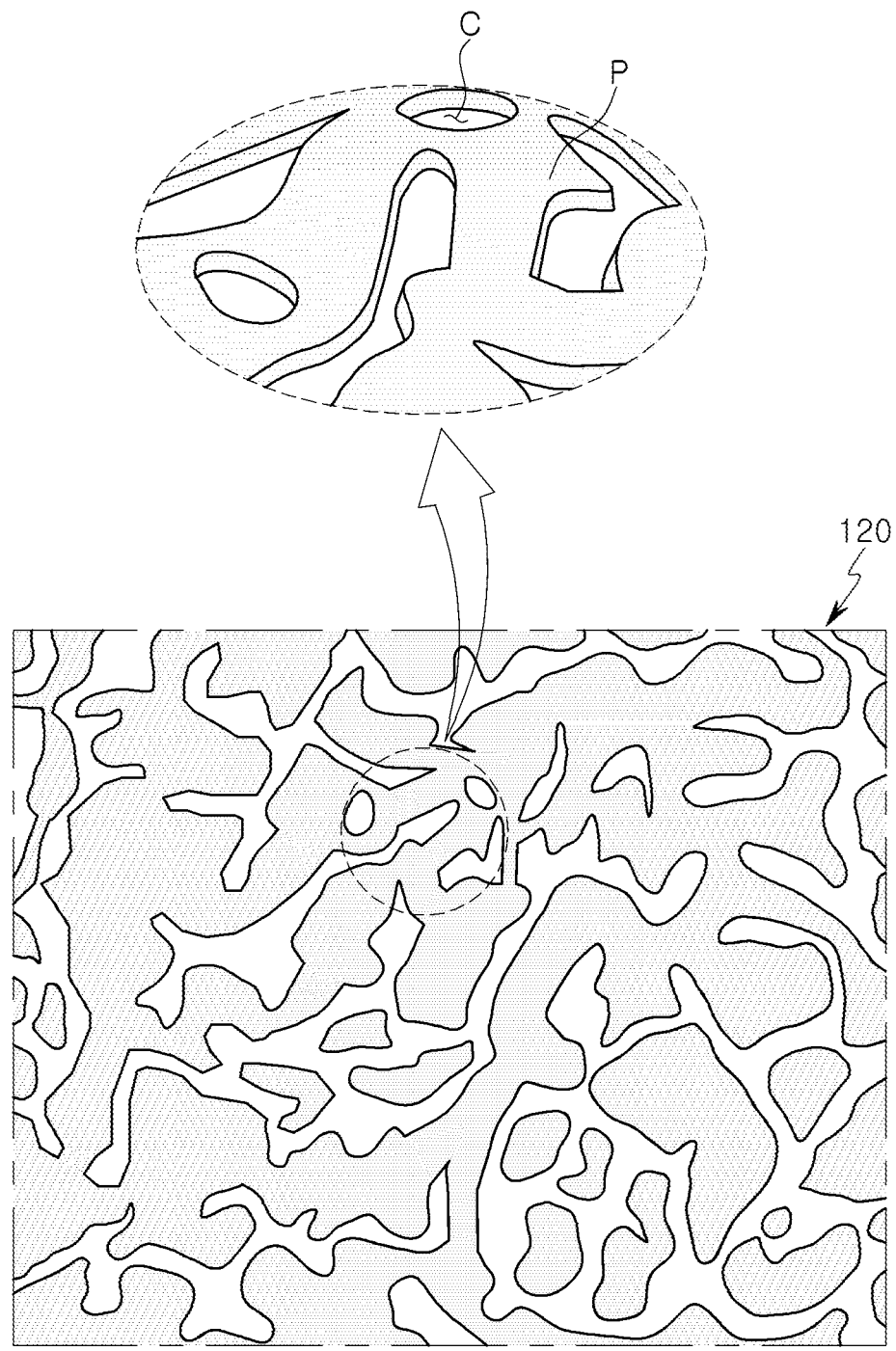

FIG. 1 is a cross-sectional diagram illustrating a lens according to an example embodiment. FIGS. 2 and 3 are enlarged diagrams illustrating one region of the lens in FIG. 1.

Referring to FIGS. 1 and 2, a lens 100 in an example embodiment may include a lens unit 110, an uneven layer 120 formed on at least a portion of the surface of the lens unit 110, a buffer layer 130 and a water-repellent layer 140. For example, the uneven layer 120 may be formed on an entire surface of the lens unit 110 such as one or more of an object-side surface and an image-side surface or the uneven layer may be formed on less than an entire surface such as one or more of the object-side surface and the image-side surface. The buffer layer 130 may cover the uneven layer 120 and may have a shape conforming to an uneven surface of the uneven layer 120. In the example embodiment, the uneven layer 120, the buffer layer 130, and the water-repellent layer 140 may be formed on one surface S1 of the lens unit 110, and may be included in a coating portion R1.

A shape or type of the lens unit 110 is not limited to any particular example and may be implemented in the form of a lens used in an optical device such as a camera module. Accordingly, the shape of the lens unit 110 may be modified to have a shape other than the example illustrated in FIG. 1. The lens unit 110 may be formed of plastic resin including a resin component, and for example, the plastic resin may include at least one of polycarbonate and polyolefin. Polyolefin may include at least one of a cycloolefin polymer and a cycloolefin copolymer.

The uneven layer 120 may be formed on one surface S1 of the lens unit 110. It may be difficult to implement a reflectivity of 2% or less through a generally used reflective coating layer on a surface of a lens, but in the example embodiment, a reflectivity of the lens 100 may be lowered through an uneven structure of the surface of the uneven layer 120, and for example, 2% or less of reflectivity may be implemented. A reflectivity may be lowered by the uneven structure because a refractive index of the uneven layer 120 may be combined with a refractive index of air such that an average refractive index may be lowered, and incident light may be scattered due to the uneven layer 120, and accordingly, a reflectivity may decrease. Also, the scattering of the incident light may become more irregular and light may be offset when the uneven structure is irregular than in the case in which the uneven structure is regular, such that an effect of lowering a reflectivity may improve. Accordingly, in the example embodiment, as illustrated in the diagram, the uneven layer 120 may include an irregularly shaped uneven structure. FIG. 3 is a diagram illustrating the shape of the irregular uneven structure of the uneven layer 120, viewed from above, and the uneven layer 120 may include a cavity C formed by at least a portion of a protrusion P of the uneven structure.

The uneven surface of the uneven layer 120 may have an increased surface roughness, such that roughness thereof may be 10 nanometers (nm) or more. A roughness may refer to an arithmetic average roughness, that is, Ra. The surface roughness Ra of the uneven surface may be measured using an atomic force microscopy (AFM) with respect to a sampled region (e.g., 5*5 μm$^2$). When a roughness of the surface is not separately increased as in a general reflective coating layer, the roughness Ra may only be 2 nm, and even when the surface roughness is high, it may be difficult for the roughness Ra to exceed 10 nm. In the example embodiment, by configuring the uneven surface of the uneven layer 120 to have a high roughness Ra, such as, for example, 10 nm or more, such that a reflectivity of the lens 100 may be reduced. Also, even when the buffer layer 130 and the water-repellent layer 140 covering the uneven layer 120 are formed, the buffer layer 130 and the water-repellent layer 140 may be formed to conform to the uneven surface of the uneven layer 120, and accordingly, fluctuations in the surface roughness Ra may not be large. The roughness Ra of the uneven layer 120 may be configured to be 100 nm or less, and when the roughness Ra of the uneven layer 120 exceeds 100 nm, a thickness of the overall coating structure may increase such that a refractive index may increase. In this case, a difference between the lens unit 110 and the refractive index may decrease, such that it may be difficult to lower the reflectivity.

Figure 4:
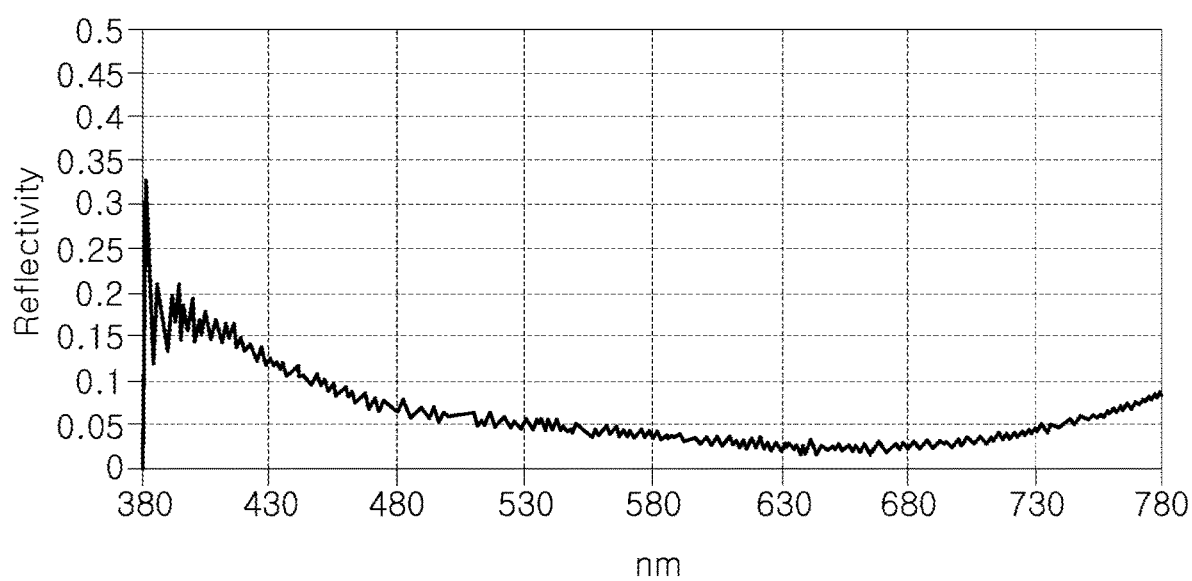
FIG. 4 is a graph of measurement of reflectivity of an uneven layer having increased surface roughness.

FIG. 4 is a graph of measurement of a reflectivity of an uneven layer having increased surface roughness, and it was found that reflectivity was lowered to 0.2 or less in most of the visible light region.

The uneven layer 120 may include a material layer having a high reflectivity in the visible light region, such as, for example, an $Al_2O_3$ layer, and specifically, the $Al_2O_3$ layer may be formed by various deposition methods, such as atomic layer deposition (ALD) or physical vapor deposition (PVD). Also, a method of forming an Al layer and oxidizing the layer to an $Al_2O_3$ layer may be used. In the example embodiment, a post-treatment process for increasing a surface roughness of the $Al_2O_3$ layer of the uneven layer 120 may be performed, and for example, the $Al_2O_3$ layer may be immersed in hot water of about 40-80° C. or in a chamber to which high humidity and temperature may be applied.

The buffer layer 130 may cover the uneven layer 120, and may be disposed between the uneven layer 120 and the water-repellent layer 140. The buffer layer 130 may be formed in a shape conforming to the uneven surface of the uneven layer 120, and accordingly, the buffer layer 130 may maintain the uneven surface having a high roughness Ra. In the example embodiment, the buffer layer 130 may conform to the uneven surface of the uneven layer 120 and a thickness t1 of the buffer layer 130 may be greater than a thickness t2 of the water-repellent layer 140. When the buffer layer 130 is employed to the surface of the uneven layer 120, the buffer layer 130 may prevent the uneven layer 120 from being excessively oxidized. Also, when the buffer layer 130 has a shape conforming to the surface uneven structure of the uneven layer 120, the surface of the coating portion R1 of the lens 100 may maintain the uneven structure, such that the reflectivity of the lens 100 may further decrease. Also, by employing the buffer layer 130, the water-repellent layer 140 disposed thereon may be uniformly formed with a sufficient thickness.

The buffer layer 130 may be formed using a process such as chemical vapor deposition (CVD) or physical vapor deposition (PVD). In this case, to form the buffer layer 130 conforming to the surface uneven structure of the uneven layer 120, a CVD process may be more suitable than a PVD process. A PVD process may include evaporation and sputtering processes, and it may be difficult to deposit the buffer layer 130 to conform to the surface uneven structure through the process, and in this case, there may be a difference in deposition thickness depending on the uneven region, such that it may not be easy to uniformly implement the thickness of the buffer layer 130. Differently from the PVD, in the case of the CVD process, a material to be deposited may be deposited through a chemical reaction, such that deposition may be performed while conforming to the uneven structure of the surface. In this case, a process suitable for conformal coating may be used. For example, the buffer layer 130 may be formed using atomic layer deposition (ALD), molecular vapor deposition (MVD), or the like. The buffer layer 130 may be formed of a material able to be implemented by a deposition process such as CVD, ALD, or MVD. Specifically, the buffer layer 130 may be formed of a material such as siloxane, $SiO_2$, SiON, $Si_3N_4$, $TiO_2$, TiON, or TiN, or a plurality of these materials may be mixed. Particularly, when the buffer layer 130 includes a Si group, the layer may be more effectively combined with the water-repellent layer 140.

When the water-repellent layer 140 has an excessive thickness, anti-reflection performance of the coating portion R1 may be reduced, and when the buffer layer 130 has a thickness greater than that of the water-repellent layer 140, low reflection properties and structural stability of the lens 100 may improve. However, when the buffer layer 130 has a great thickness to the extent that the uneven surface of the uneven layer 120 may not be maintained, the reflectivity may increase. Therefore, in the example embodiment, the thickness t1 of the buffer layer 130 may be adjusted to conform to the uneven surface of the uneven layer 120. The thickness t1 of the buffer layer 130 may be measured using both a non-destructive test and a destructive test. Examples of non-destructive test may include an ellipsometer and a reflectometer. As an example of the destructive analysis, a focused ion beam (FIB) cross-section process may be performed on the buffer layer 130 and a TEM analysis may be performed, and the cross-section of the buffer layer 130 may include a central portion of the lens unit 110, that is, the thickest region of the lens unit 110. Also, the thickness t1 of the buffer layer 130 may be defined as a distance measured in a direction perpendicular to the surface of the uneven layer 120, and may be determined as an average value of values measured in a plurality of regions having an equal distance therebetween.

The water-repellent layer 140 may be employed to prevent oxidation of the surface of the uneven layer 120, and may have a shape conforming to the surface of the buffer layer 130. As described above, reflectivity may be lowered due to the uneven structure of the surface of the uneven layer 120, but when the surface of the uneven layer 120 is oxidized, the thickness of the uneven layer 120 may change and accordingly, reflectivity may increase again. Particularly, as the surface area of the uneven layer 120 increases due to the uneven structure, this phenomenon may be further accelerated. As in the example embodiment, by employing the water-repellent layer 140 covering the buffer layer 130, a repulsive force with hydroxyl groups may increase, and surface oxidation in the uneven structure of the uneven layer 120 may be reduced in particular, and accordingly, the issue of an increase in the reflectivity of the lens 100 may be reduced. As an example of a material forming the water-repellent layer 140, the water-repellent layer 140 may include a fluorocarbon component having a Si head group, and accordingly, the water-repellent layer 140 may form a chemical bond with the buffer layer 130. Specifically, a Si head group of the water-repellent layer 140 may combine with a surface oxygen group of the buffer layer 130 and may form a chemical bond. To this end, the buffer layer 130 may include a Si component. Since the water-repellent layer 140 forms a chemical bond with the buffer layer 130, the water-repellent layer 140 may have improved structural stability and may have an even thickness.

The thickness t2 of the water-repellent layer 140 may be measured using a non-destructive test or a destructive test similar to the buffer layer 130. However, when it is difficult to use the above-described thickness measurement method because the water-repellent layer 140 is thin, an energy dispersive X-ray Spectroscopy (EDS) analysis may be performed in the thickness direction during TEM analysis to identify the component of the water-repellent layer 140, that is, for example, a fluorine component, such that the water-repellent layer 140 may be distinguished. The above-described thickness measurement methods may be applied to the other layers in addition to the buffer layer 130 and the water-repellent layer 140.

In the example embodiments, the water repellency performance of each sample was observed by varying the coating structure of the lens as below, and among the experimental examples, sample #1 has no buffer layer and no water repellency layer, and sample #2 has no buffer layer. Samples #3 to #7 may have a coating structure in which the thickness of the buffer layer is increased from 2 nm to 10 nm.

TABLE 1

| Experimental example | Coating portion structure | Contact angle (°) |
|---|---|---|
| #1* | Uneven layer | 9.3 |
| #2 | Uneven layer + Water-repellent layer | 99.5 |
| #3 | Uneven layer + Buffer layer(2 nm) + Water-repellent layer | 145.3 |
| #4 | Uneven layer + Buffer layer(4 nm) + Water-repellent layer | 146.7 |
| #5 | Uneven layer + Buffer layer(6 nm) + Water-repellent layer | 150.4 |

TABLE 1-continued

| Experimental example | Coating portion structure | Contact angle (°) |
|---|---|---|
| #6 | Uneven layer + Buffer layer(8 nm) + Water-repellent layer | 146.5 |
| #7 | Uneven layer + Buffer layer(10 nm) + Water-repellent layer | 132.5 |

In the case of sample #1, a contact angle with a hydroxyl group exhibited a low value of less than 10°, which indicate that the surface is hydrophilic. In comparison, in the case of sample #2, it is indicated that the contact angle increased by employing the water-repellent layer forming a chemical bond with the uneven layer. Particularly, in samples #3 to #7 which employed the buffer layer 130 and the water-repellent layer 140 together, a contact angle increased to 130°, such that sufficient water repellency performance was implemented. Considering the experimental results and that it may be preferable for the buffer layer 130 to have a thickness not significantly affecting the transmittance or reflectivity of the lens 100, the thickness t1 may be 2 nm or more and 10 nm or less. Also, the thickness t2 of the water-repellent layer 140 may be 10 nm or less as a condition for securing water-repellent performance and not significantly affecting the transmittance or reflectivity of the lens 100. The above-described buffer layer 130 and water-repellent layer 140 may be formed by various thin film processes, such as, for example, by molecular vapor deposition (MVD).

Figure 5:
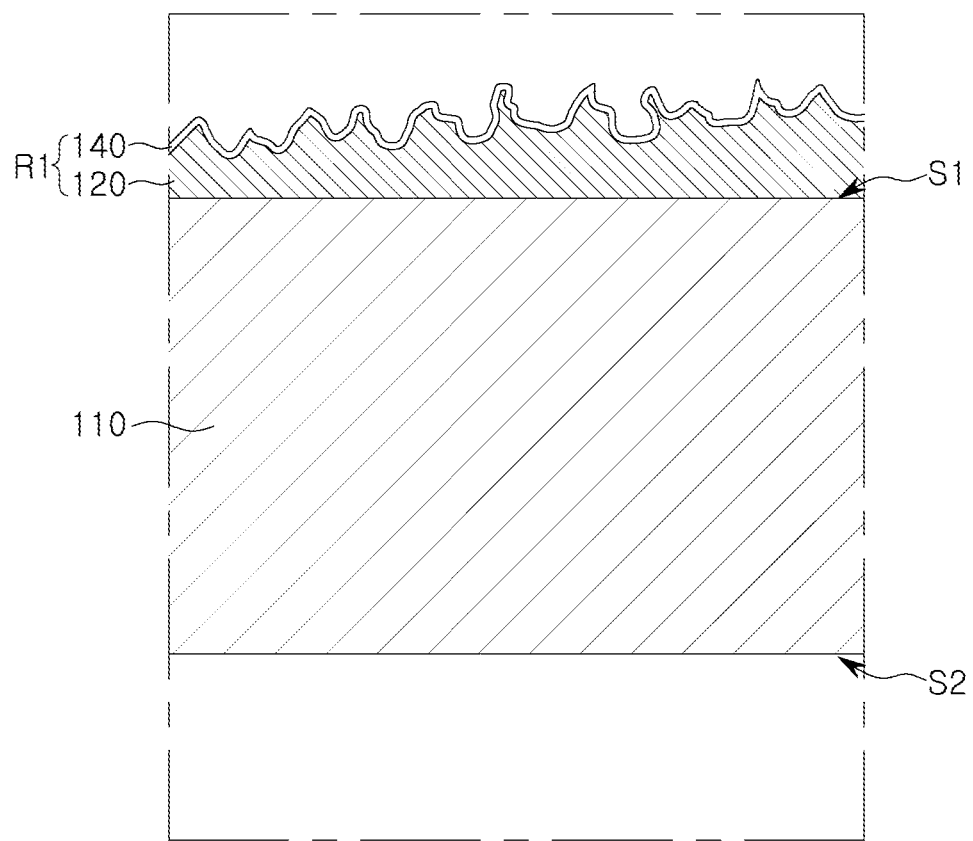
FIG. 5 is a diagram illustrating a lens according to a modified example.
Figure 6:
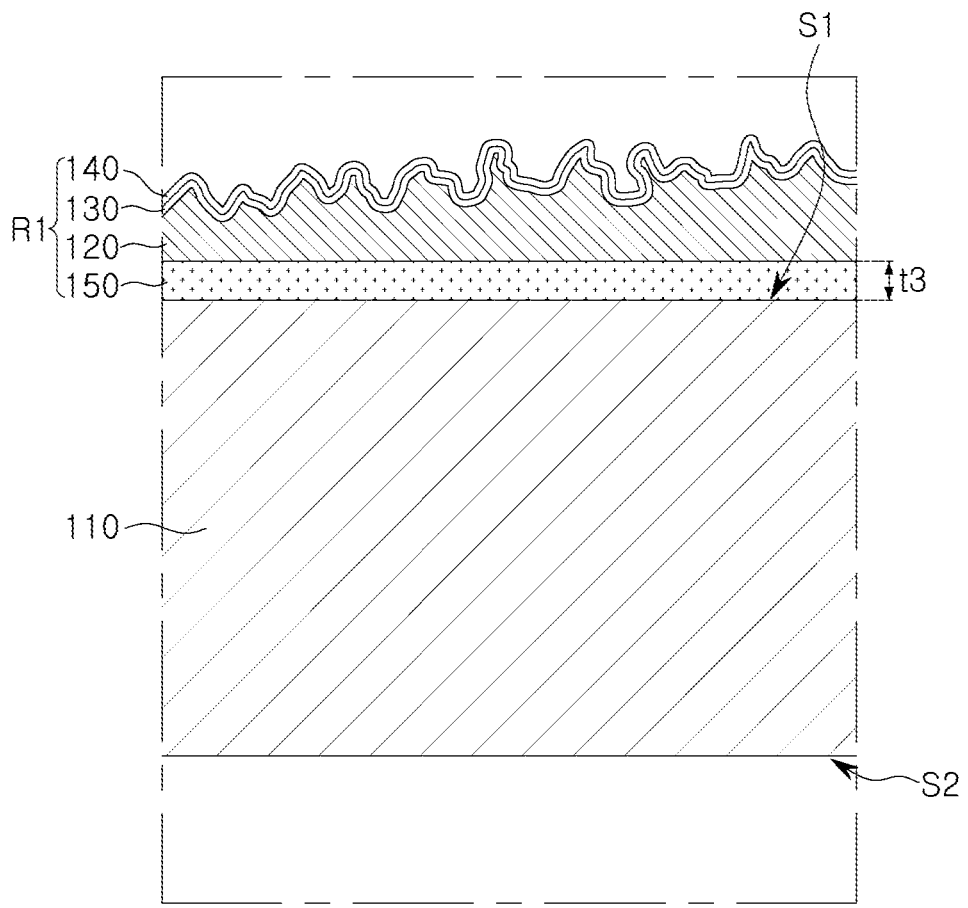
FIG. 6 is a diagram illustrating a lens according to a modified example.

In the above-described example embodiment, the coating portion R1 may include the uneven layer 120, the buffer layer 130, and the water-repellent layer 140 in the order of being adjacent to the one surface S1 of the lens portion 110, but as illustrated in FIG. 5, when a stable structure is formed as the uneven layer 120 and the water-repellent layer 140 form a chemical bond, the buffer layer 130 may not be provided. This example may correspond to the #2 sample in the above experimental result, and exhibited a contact angle approximate to 100°, and as compared to the #1 sample in which the water-repellent layer 140 is not provided, water repellency performance was significantly improved. In this case, a Si head group of the water-repellent layer 140 may be combined with a surface oxygen group of the uneven layer 120 and a chemical bond may be formed. To this end, the uneven layer 120 may include an $Al_2O_3$ component. Since the water-repellent layer 140 forms a chemical bond with the uneven layer 120, the water-repellent layer 140 may have improved structural stability and may be formed with an even thickness. The structure in which the water-repellent layer 140 is directly formed on the surface of the uneven layer 120 may be applied to the modified examples described below.

In the example embodiment, to examine changes in reflectivity in the 8585 high temperature/high humidity reliability environment, changes in reflectivity were examined in samples of Examples 1 and 5, and the results are illustrated in Table 2 below. The 8585 high temperature/high humidity reliability test was performed by putting the sample in a chamber of 85° C. and 85% humidity for 96 hours, and the amount of change in reflectivity before and after having gone through the reliability environment was measured. In the case of Example 1, it was found that the reflectivity increased by 2.75% after having gone through the 8585 reliability environment in the 680 nm wavelength band, but in Example 5, the reflectivity decreased by 0.15%, indicating that the reflectivity hardly changed.

TABLE 2

| Amount of change in reflectivity (680 nm) | |
|---|---|
| #1* | Increase by 2.75% |
| #5 | Decrease by 0.15% |

Figure 7:
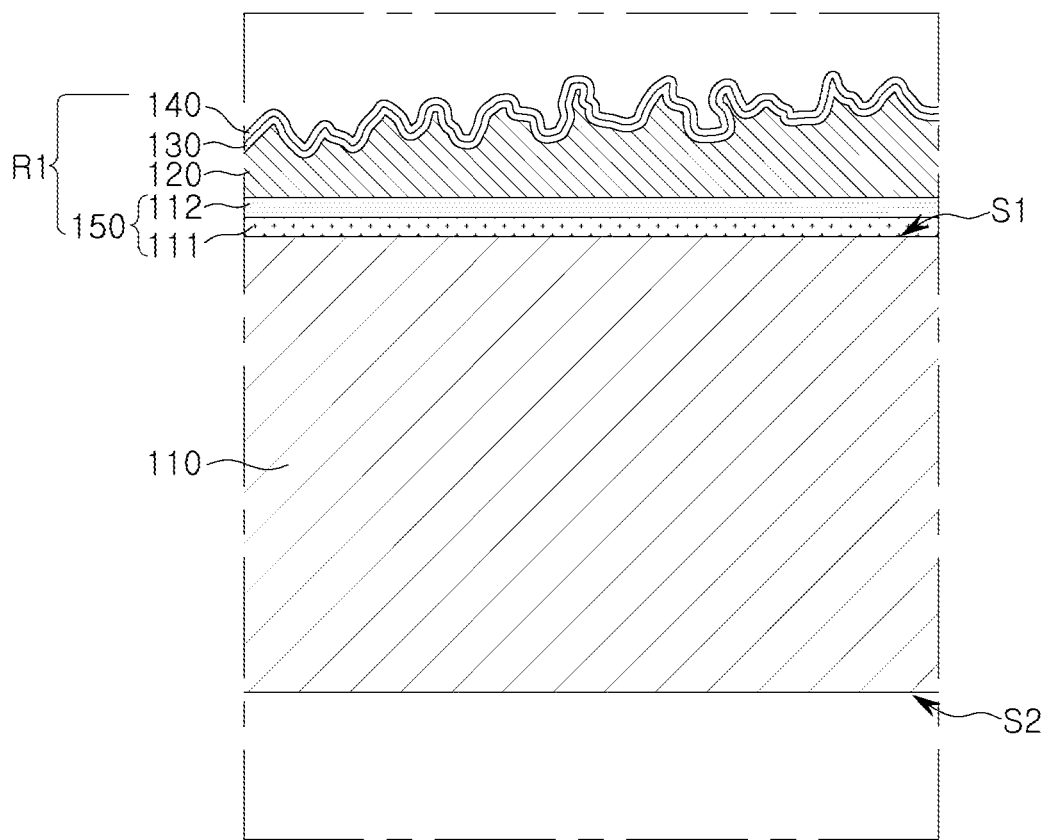
FIG. 7 is a diagram illustrating a lens according to a modified example.

Hereinafter, lenses of modified examples will be described with reference to FIGS. 6 to 13. In the example in FIG. 6, the coating portion R1 may further include a base layer 150 disposed between the lens unit 110 and the uneven layer 120. The base layer 150 may further decrease the reflectivity of the coating portion R1, and also, the uneven layer 120 may be stably formed. The base layer 150 may include a $SiO_2$ layer, and a thickness t3 thereof may be 200 nm or less in consideration of a reflection reducing function. In this case, for example, the base layer 150 may be formed in a multilayer structure instead of a single-layer structure such that reflectivity may further decrease. For example, as illustrated in FIG. 7, the base layer 150 may include a laminate structure including a first material layer 111 and a second material layer 112, for example a $SiO_2$ layer 111 and a $TiO_2$ layer 112.

Figure 8:
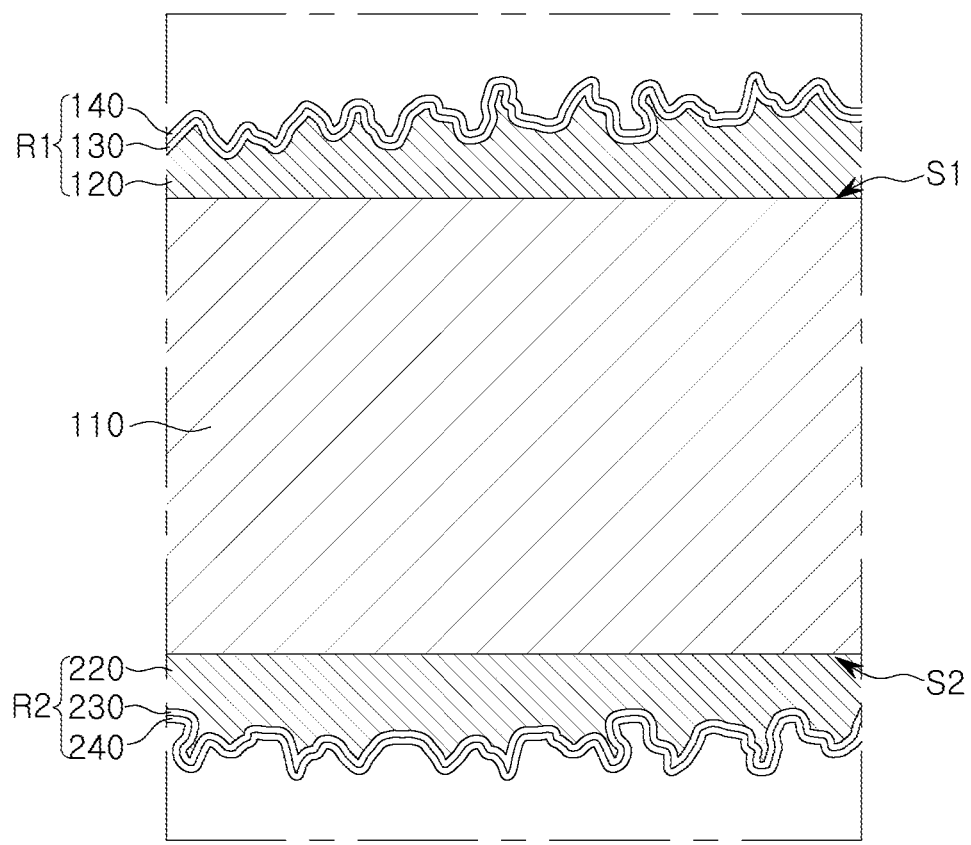
FIG. 8 is a diagram illustrating a lens according to a modified example.

In the case of the modified example in FIG. 8, an additional coating portion R2 may be formed on the other surface S2 opposite to the one surface S1 in the lens unit 110, and hereinafter, R1 will be referred to as a first coating portion and R2 will be referred to as a second coating portion. In the present modified example, the first coating portion R1 and the second coating portion R2 may be formed to have a symmetrical structure with respect to the lens unit 110. That is, similarly to the first coating portion R1, the second coating portion R2 may include an uneven layer 220, a buffer layer 230, and a water-repellent layer 240 formed in order on the other surface S2 of the lens unit 110, and each of the components may have the same shape as those of the components of the first coating portion R1. As the second coating portion R2 is included, the overall reflectivity of the lens 100 may be further reduced. Also, since the first coating portion R1 and the second coating portion R2 have a symmetrical structure, the components may be formed simultaneously. However, the configuration in which the first and second coating portions R1 and R2 are formed in a symmetrical structure may not indicate that the thicknesses and shapes of the layers are the same, and in the first and second coating portions R1 and R2, the arrangement orders of the layers from the one surface S1 and the other surface S2 of the lens unit 110 may be the same. For example, the uneven layers 120 and 220 in the first and second coating portions R1 and R2 may have uneven structures in different shapes.

The first and second coating portions R1 and R2 may be formed in an asymmetric structure to improve low-reflection performance as in the modified examples described below, and in the case of an asymmetric structure, the first and second coating portions R1 and R2 may be efficiently formed. First, as in the modified example in FIG. 9, the first coating portion R1 may further include a base layer 150 disposed between the lens unit 110 and the uneven layer 120 differently from the example embodiment in FIG. 8, and the base layer 150 may include a $SiO_2$ layer. The second coating portion R2 may include a base layer 250 formed on the other surface S2 of the lens unit 110, and the base layer 250 may include a $SiO_2$ layer similarly to the first coating portion R1. As illustrated in the drawing, the second coating portion R2 may not form a symmetrical structure with the first coating portion R1 and may not include another coating layer other than the base layer 250. Also, as in the modified example in FIG. 10, the first coating portion R1 may be configured to not include the base layer 150, and even in this case, the first and second coating portions R1 and R2 may form an asymmetric structure. That is, in the modified example in FIG. 10, the uneven layer 120 of the first coating portion R1 may be directly formed on one surface S1 of the lens unit 110.

Figure 9:
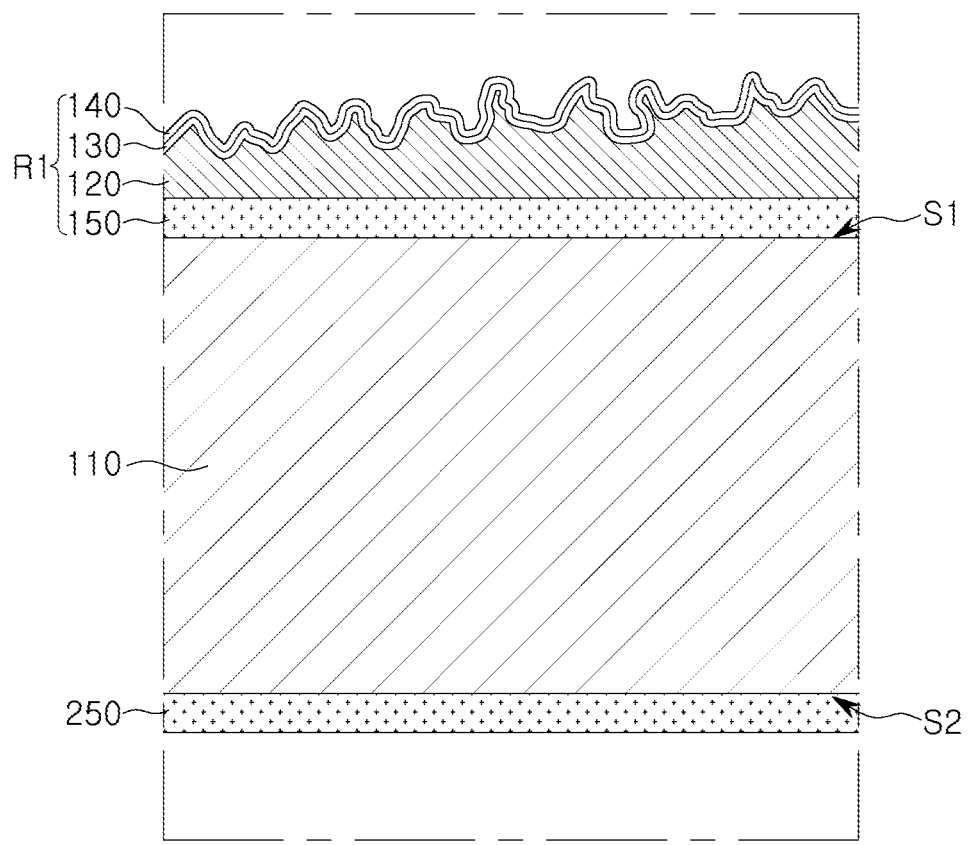
FIG. 9 is a diagram illustrating a lens according to a modified example.
Figure 10:
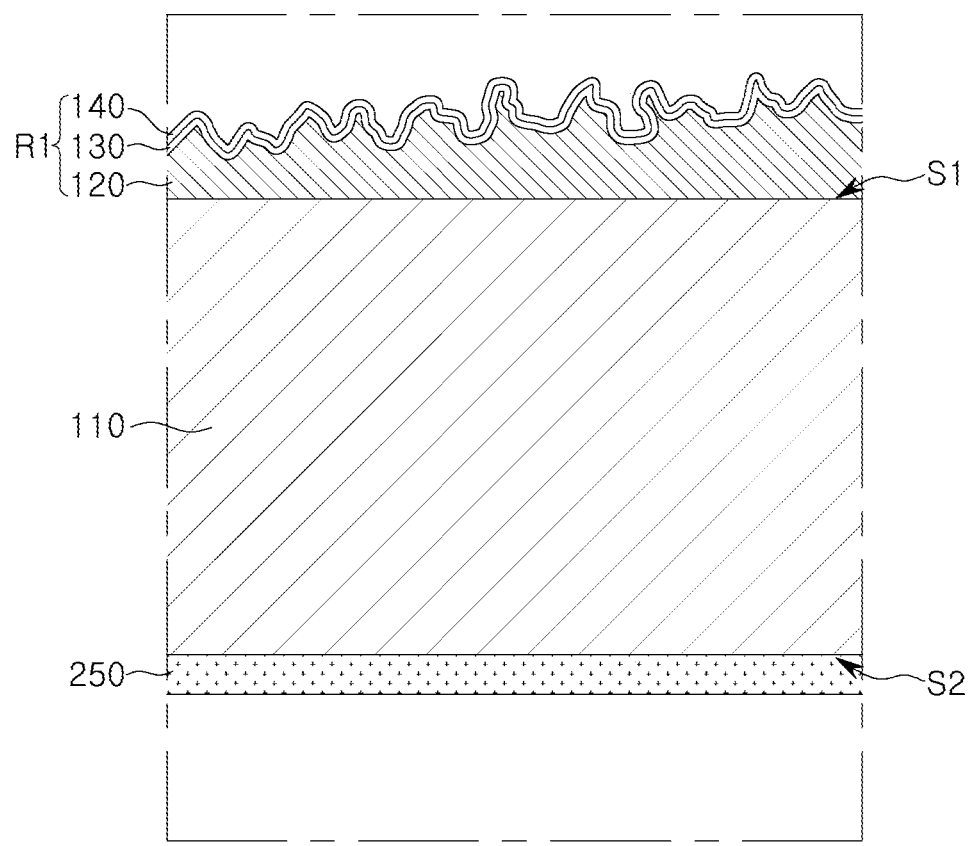
FIG. 10 is a diagram illustrating a lens according to a modified example.
Figure 11:
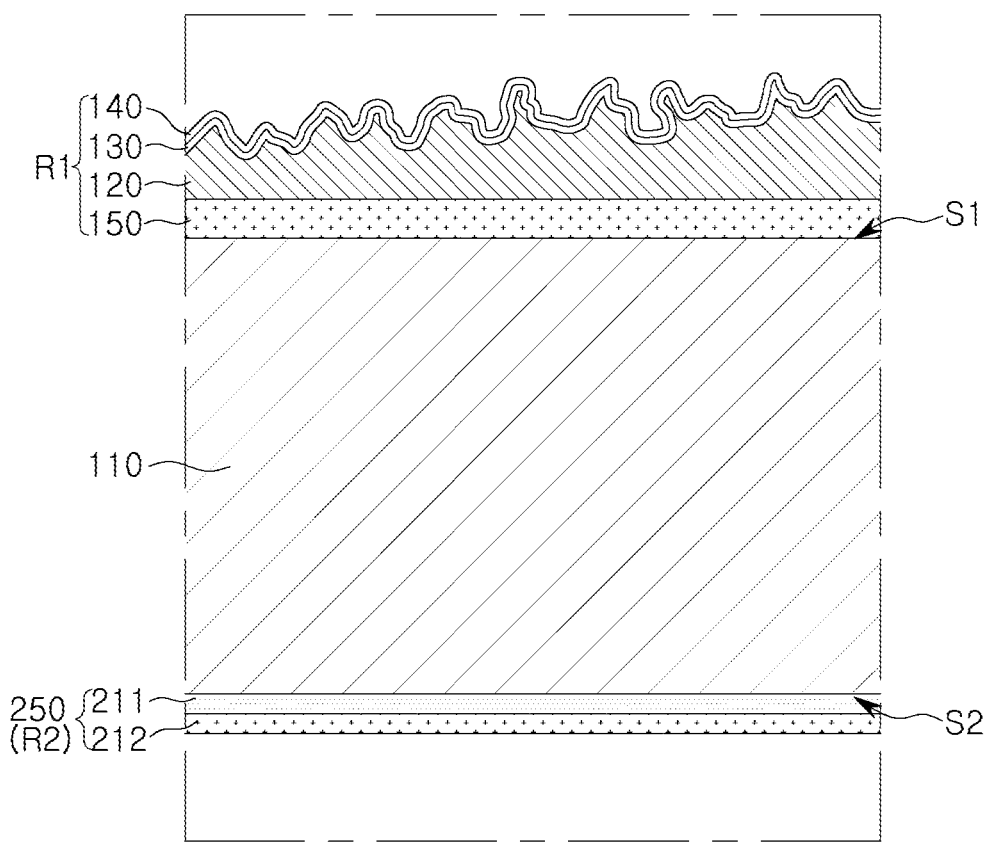
FIG. 11 is a diagram illustrating a lens according to a modified example.
Figure 12:
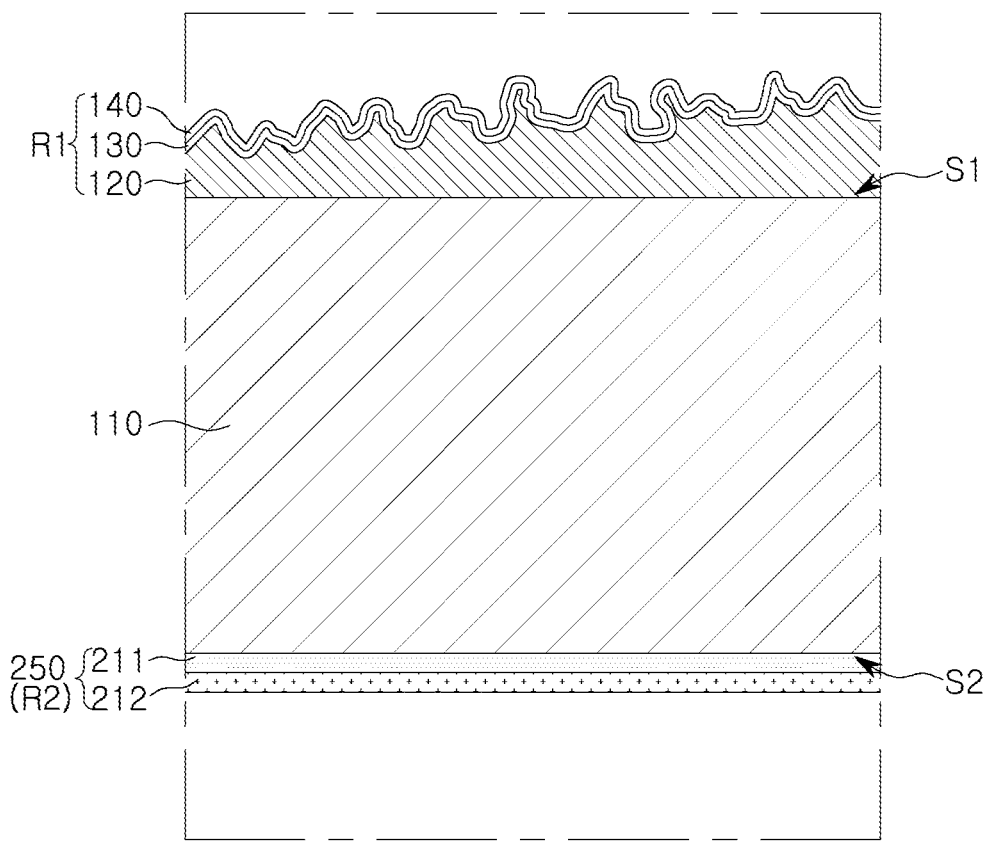
FIG. 12 is a diagram illustrating a lens according to a modified example.
Figure 13:
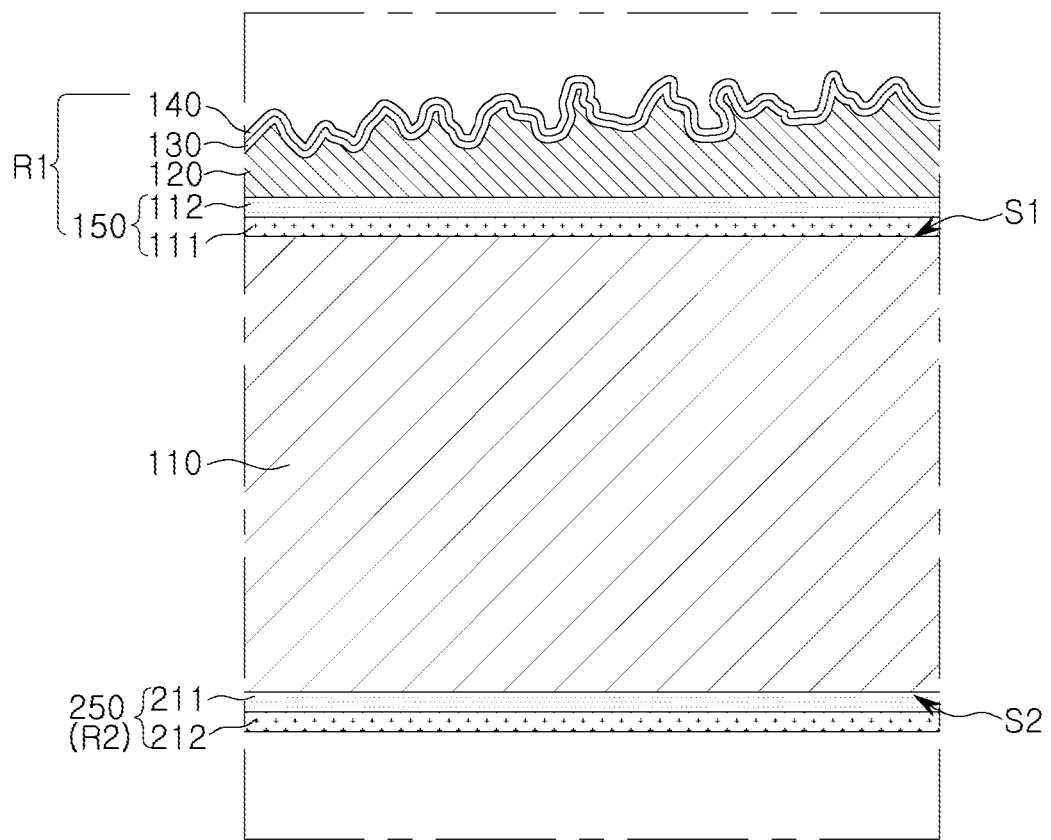
FIG. 13 is a diagram illustrating a lens according to a modified example.

In the case of the modified example in FIG. 11, the first coating portion R1 may be the same as in the example embodiment in FIG. 9, but in the example in FIG. 11, the second coating portion R2 may be implemented in a multilayer structure. That is, the base layer 250 of the second coating portion R2 may include a laminated structure including a SiO$_2$ layer 211 and a TiO$_2$ layer 212. As illustrated in the diagram, the second coating portion R2 does not form a symmetrical structure with the first coating portion R1 and does not include another coating layer other than the base layer 250. Also, as in the modified example in FIG. 12, the first coating portion R1 may be implemented in a form not including the base layer 150, and even in this case, the first and second coating portions R1 and R2 may form an asymmetric structure. Also, as in the modified example in FIG. 13, the first coating portion R1 may be implemented in a form in which the base layer 150 may include a multilayer structure, such as, for example, a laminated structure including the SiO$_2$ layer 111 and the TiO$_2$ layer 112.

Figure 14:
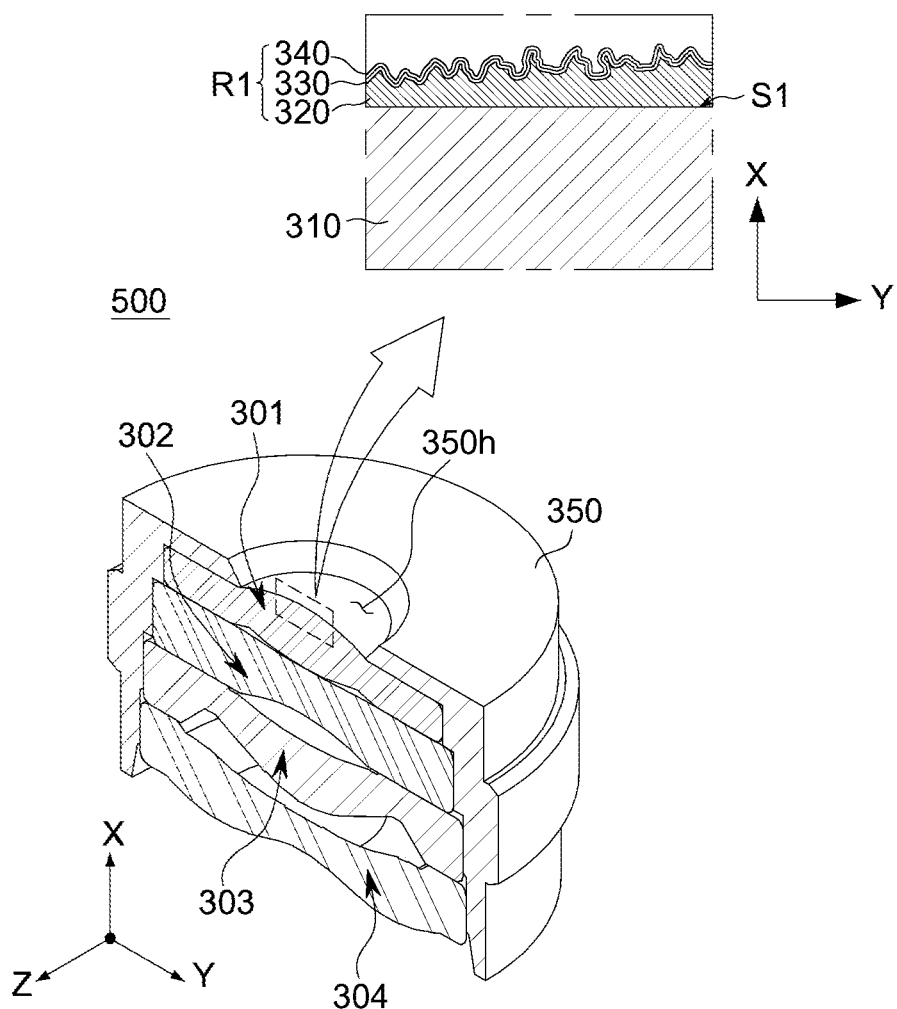
FIG. 14 is a perspective diagram illustrating a lens assembly.

FIG. 14 is a perspective diagram illustrating a lens assembly. In the example embodiment, the lens assembly 500 may include at least one lens 301-304. In the example embodiment, the lens assembly 500 may include four lenses 301-304, and the number of the lenses 301-304 or the shape of each of the lenses 301-304 may be varied depending on a necessary function or size condition. The lens assembly 500 may include a lens barrel 350 having a lens hole 350h in addition to the plurality of lenses 301-304. The lens barrel 350 may have a hollow cylindrical shape, and the lens hole 350h for transmitting light may be formed through one surface of the lens barrel 350. At least one lens 301 among the plurality of lenses 301-304 may employ a low-reflection lens according to one or more of the above-described example embodiments. For example, as illustrated in the drawing, the low-reflection lens 301 may include a lens unit 310 and a coating portion R1 disposed on one surface S1 thereof, and the coating portion R1 may include an uneven layer 320, a buffer layer 330 and a water-repellent layer 340. In this case, the low-reflection lens 301 may be disposed on an outermost side of the lens assembly 500 among the plurality of lenses 301-304 in the direction of a light incident side, that is, in an optical axis direction (X-direction in the drawing). Since the reflectivity of the lens 301 on the outermost side among the plurality of lenses 301-304 may greatly affect the overall reflectivity of the lens assembly 500, as in the example embodiment, by employing the low-reflection lens 301 on the outermost side, the effect of reducing the reflectivity of the lens assembly 500 may increase.

The low-reflection lens 301 may have various structures (e.g., the examples illustrated in FIGS. 5 to 13) in addition to the example illustrated in FIG. 14. Also, the reflectivity of the lens assembly 500 may be further reduced by applying a coating portion such as the low-reflection lens 301 to at least one of the other lenses 302-304 other than the outermost lens 301. These various modified structures of the lens assembly 500 may be applied to a mobile electronic device as below.

Figure 15:
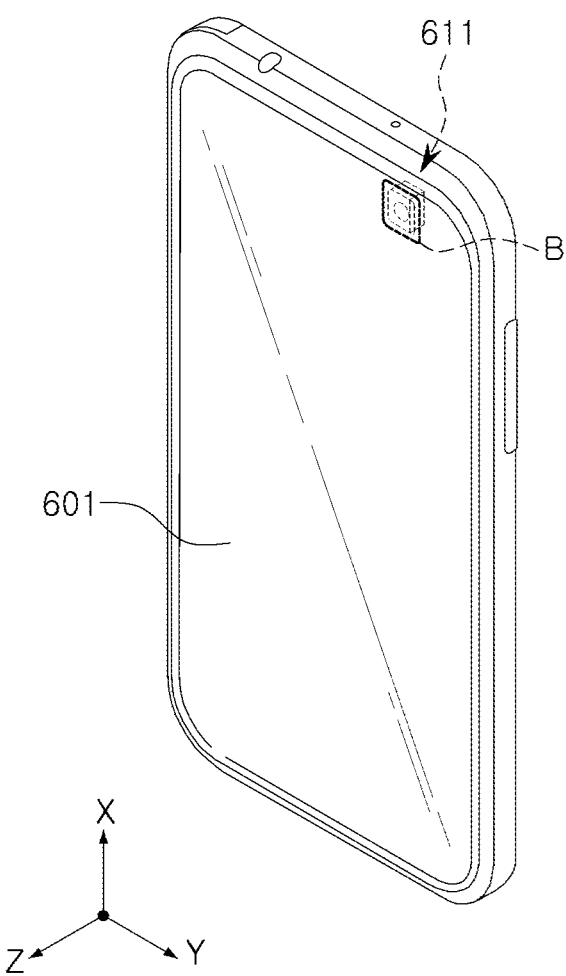
FIGS. 15 and 16 are perspective diagrams illustrating a mobile electronic device, illustrating a front portion and a rear portion, respectively.
Figure 16:
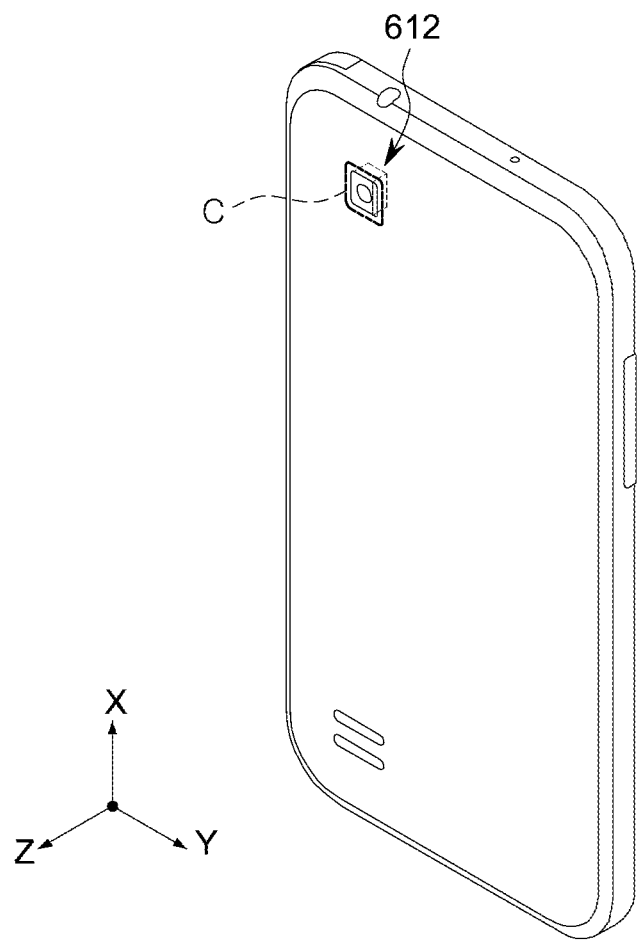
Figure 17:
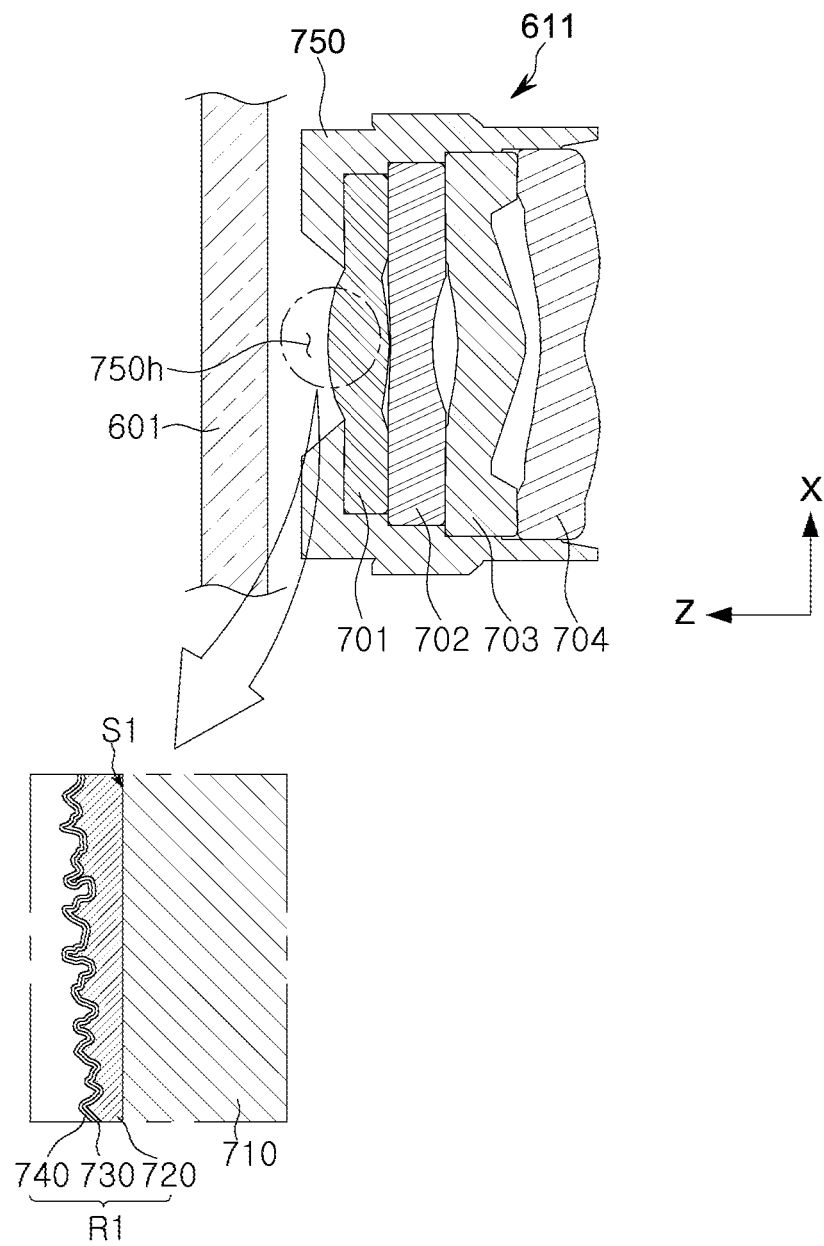
FIGS. 17 and 18 are enlarged cross-sectional diagrams illustrating a peripheral region of a lens assembly in the diagrams in FIGS. 15 and 16.
Figure 18:
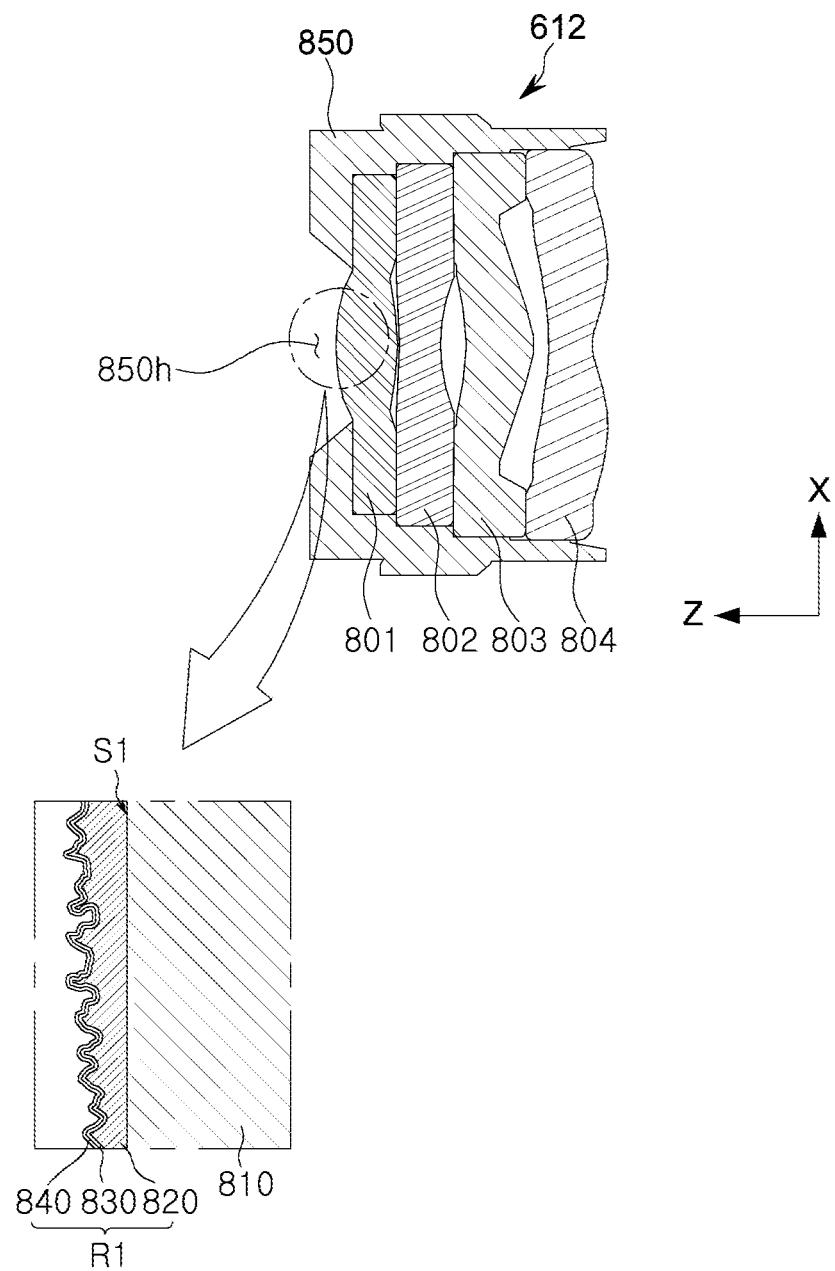

FIGS. 15 and 16 are perspective diagrams illustrating a mobile electronic device, illustrating a front portion and a rear portion, respectively. FIGS. 17 and 18 are enlarged cross-sectional diagrams illustrating a peripheral region of a lens assembly in the diagrams in FIGS. 15 and 16. A mobile electronic device 600 may be provided in the form of various electronic devices such as a smart-phone, a tablet PC, and a laptop, and in the example embodiment, a smart-phone will be described as an example. The mobile electronic device 600 may include a display unit 601, a first lens assembly 611, and a second lens assembly 612 as main components. However, if desired, only one of the first and second lens assemblies 611 and 612 may be used. In addition to the display unit 601 and the lens assemblies 611 and 612, as the other main components (e.g., a processing module, a communication module, a touch sensing module, etc.) included in the mobile electronic device 600, generally used components may be used, and a detailed description thereof will not be provided.

The first and second lens assemblies 611 and 612 may have the structure described with reference to FIG. 14 including various structures (e.g., the examples illustrated in FIGS. 5 to 13) in addition to the example illustrated in FIG. 14, and specifically, the first lens assembly 611 may include a lens barrel 750 having a lens hole 750h in addition to a plurality of lenses 701-704. At least one lens 701 among the plurality of lenses 701-704 may employ the low-reflection lens according to one or more of the above-described example embodiments. That is, as illustrated, the low-reflection lens 701 may include a lens unit 710 and a coating portion R1 disposed on one surface S1 thereof, and the coating portion R1 may include an uneven layer 720, a buffer layer 730 and a water-repellent layer 740. In this case, the low-reflection lens 701 may be disposed on the outermost side of the first lens assembly 611 among the plurality of lenses 701-704 in the direction in which light is incident, that is, in the optical axis direction (Z direction in the drawing). Similarly, the second lens assembly 612 may include a lens barrel 850 having a lens hole 850h in addition to a plurality of lenses 801-804. At least one lens 801 among the plurality of lenses 801-804 may employ the low-reflection lens according to one or more of the above-described example embodiments. That is, as illustrated, the low-reflection lens 801 may include a lens unit 810 and a coating portion R1 disposed on one surface S1 thereof, and the coating portion R1 may include an uneven layer 820, a buffer layer 830 and a water-repellent layer 840. In this case, the low reflection lens 801 may be disposed on the outermost side of the second lens assembly 612 among the plurality of lenses 801-804 in the direction in which light is incident, that is, in the optical axis direction (Z direction in the drawing).

As illustrated, the first lens assembly 611 may be covered by the display unit 601, and for example, the first lens assembly 611 may be covered by a tempered glass portion of the display unit 601. However, when the tempered glass covers the first lens assembly 611, the tempered glass may not need to be a portion of the display unit 601. When the first lens assembly 611 is covered by the display unit 601 as above, the amount of light incident to the lens may be reduced, such that the reflectivity of the first lens assembly 611 may greatly affect the performance of the camera module. In other words, in the case of the front portion of the mobile electronic device 600, the first lens assembly 611 may be covered by the display unit 601, which corresponds to an under display camera (UDC) structure. The UDC structure may reduce a processing of a camera hole, but as additional tempered glass is disposed on the camera to implement the UDC structure, the amount of light incident to the camera may be reduced, such that performance may degrade. Therefore, when the reflectivity of the lens is high in the UDC structure, the performance of the camera module may be greatly reduced, however, as in the example embodiment, by disposing the low-reflection lens 701 the most adjacent to the incident side, that is, the display unit 601, the effect of reducing the reflectivity of the first lens assembly 611 may increase, such that the performance of a camera module including the same may improve. In the above-described example, the example in which the first lens assembly 611 is covered by the display unit 601 has been described, but in example embodiments, the second lens assembly 612 may also be covered by an optical element in which loss of light may occur, that is, for example, tempered glass, and in this case, the importance of the effect of reducing the reflectivity of the second lens assembly 612 may also be even greater.

According to the aforementioned example embodiments, the lens may include a surface coating structure having low reflectivity, thereby reducing flares.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens, comprising:
a lens unit;
an uneven layer disposed on at least a portion of a surface of the lens unit;
a buffer layer covering the uneven layer and having a shape conforming to an uneven surface of the uneven layer; and
a water-repellent layer covering the buffer layer,
wherein the uneven layer has a reflectivity of 0.2 or less in the visible light region at least in a range of 400 nm to 780 nm,
wherein the uneven layer comprises an uneven structure having an irregular shape, and
wherein the uneven layer comprises a cavity, edges of the cavity are comprised of the uneven structure, and the uneven structure surrounds the cavity.

2. The lens of claim 1, wherein the buffer layer has a thickness greater than a thickness of the water-repellent layer.

3. The lens of claim 1, wherein the uneven surface of the uneven layer has a roughness Ra of 10 nm or more.

4. The lens of claim 1, wherein the uneven surface of the uneven layer has a roughness Ra of 10 nm or more and 100 nm or less.

5. The lens of claim 1, wherein a thickness of the buffer layer is 2 nm or more and 10 nm or less.

6. The lens of claim 1, wherein the buffer layer includes at least one material selected from a group consisting of siloxane, $SiO_2$, SiON, $Si_3N_4$, $TiO_2$, TiON, and TiN.

7. The lens of claim 1, wherein the water-repellent layer has a shape conforming to a surface of the buffer layer.

8. The lens of claim 1, wherein the water-repellent layer forms a chemical bond with the buffer layer.

9. The lens of claim 1, wherein a thickness of the water-repellent layer is 10 nm or less.

10. The lens of claim 1, further comprising:
a base layer disposed between the lens unit and the uneven layer.

11. The lens of claim 10, wherein the base layer comprises a $SiO_2$ layer.

12. The lens of claim 10, wherein a thickness of the base layer is 200 nm or less.

13. The lens of claim 10, wherein the base layer comprises a laminated structure including a $SiO_2$ layer and a $TiO_2$ layer.

14. The lens of claim 1, wherein the uneven layer is formed on one surface of the lens unit and an other surface opposing to the one surface.

15. The lens of claim 14, further comprising:
a base layer disposed on the one surface and the other surface of the lens unit between the lens unit and the uneven layer.

16. The lens of claim 15, wherein the base layer comprises a laminated structure including a $SiO_2$ layer and a $TiO_2$ layer.

17. The lens of claim 14,
wherein the uneven layer is formed directly on the one surface of the lens unit, and
wherein the lens further comprises a base layer disposed between the lens unit and the uneven layer on the other surface of the lens unit.

18. The lens of claim 17, wherein the base layer comprises a laminated structure including a $SiO_2$ layer and a $TiO_2$ layer.

19. A lens assembly, comprising:
one or more lenses,
wherein at least one of the one or more lenses is a low-reflection lens comprising a lens unit, an uneven layer formed on at least a portion of a surface of the lens unit, a buffer layer covering the uneven layer and having a shape conforming to an uneven surface of the uneven layer, and a water-repellent layer covering the buffer layer,
wherein the uneven layer has a reflectivity of 0.2 or less in the visible light region at least in a range of 400 nm to 780 nm,
wherein the uneven layer comprises a cavity, edges of the cavity are comprised of an uneven structure of the uneven layer, and the uneven structure surrounds the cavity.

20. The lens assembly of claim 19, wherein the buffer layer has a thickness greater than a thickness of the water-repellent layer.

21. The lens assembly of claim 19, wherein the low-reflection lens is disposed on an outermost side of the lens assembly in an optical axis direction among the one or more lenses.

22. A mobile electronic device, comprising:
a display unit; and
a lens assembly,
wherein the lens assembly includes one or more lenses, and
wherein at least one of the one or more lenses is a low-reflection lens comprising a lens unit, an uneven layer formed on at least a portion of a surface of the lens unit, a buffer layer covering the uneven layer and having a shape conforming to an uneven surface of the uneven layer, and a water-repellent layer covering the buffer layer, wherein the uneven layer has a reflectivity of 0.2 or less in the visible light region at least in a range of 400 nm to 780 nm, wherein the uneven layer comprises a cavity, edges of the cavity are comprised of an uneven structure of the uneven layer, and the uneven structure surrounds the cavity.

23. The mobile electronic device of claim 22, wherein the low-reflection lens is disposed on an outermost side of the lens assembly in an optical axis direction of the one or more lenses.

24. The mobile electronic device of claim 22, wherein the lens assembly is covered by the display unit.

25. The mobile electronic device of claim 22, wherein the lens assembly is covered by tempered glass.

26. A low-reflection lens, comprising:
a lens unit comprising one surface and an other surface opposing the one surface;
an uneven layer disposed on one or more of the one surface and the other surface; and
a water repellent layer disposed on the uneven layer,
wherein the uneven layer has a reflectivity of 0.2 or less in the visible light region at least in a range of 400 nm to 780 nm,
wherein the uneven layer comprises a cavity, edges of the cavity are comprised of an uneven structure of the uneven layer, and the uneven structure surrounds the cavity.

27. The low-reflection lens of claim 26, further comprising a buffer layer disposed between the uneven layer and the water repellent layer on one or more of the one surface and the other surface.

28. The low-reflection lens of claim 26, further comprising a base layer disposed between the uneven layer and the lens unit on one or more of the one surface and the other surface.

29. The low-reflection lens of claim 28, wherein the base layer comprises a laminated structure including a first material layer and a second material layer different from the first material layer on one or more of the one surface and the other surface.

30. A lens assembly, comprising:
one or more lenses,
wherein the one or more lenses comprise at least one low-reflection lens of claim 26.

31. The lens assembly of claim 30, wherein the at least one low-reflection lens comprises a lens disposed on an outermost side of the lens assembly in an optical axis direction of the one or more lenses.

32. A mobile electronic device, comprising:
the lens assembly of claim 30; and
a display unit,
wherein the lens assembly is covered by one or more of the display unit and a tempered glass.

\* \* \* \* \*